Jan. 5, 1932.    M. MEISEL    1,839,244
NECKLESS GUITAR MANDOLIN
Filed March 29, 1929
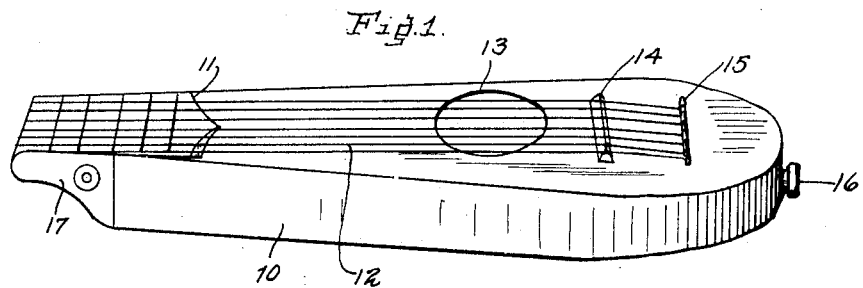
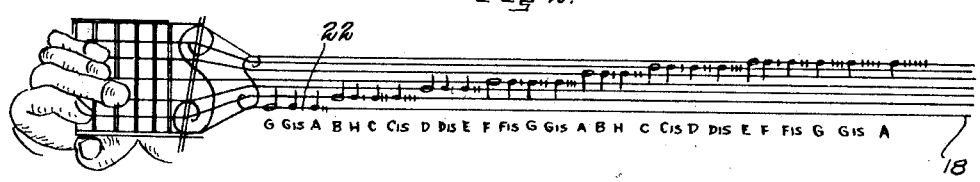
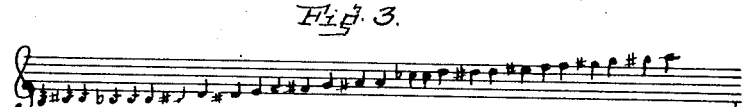
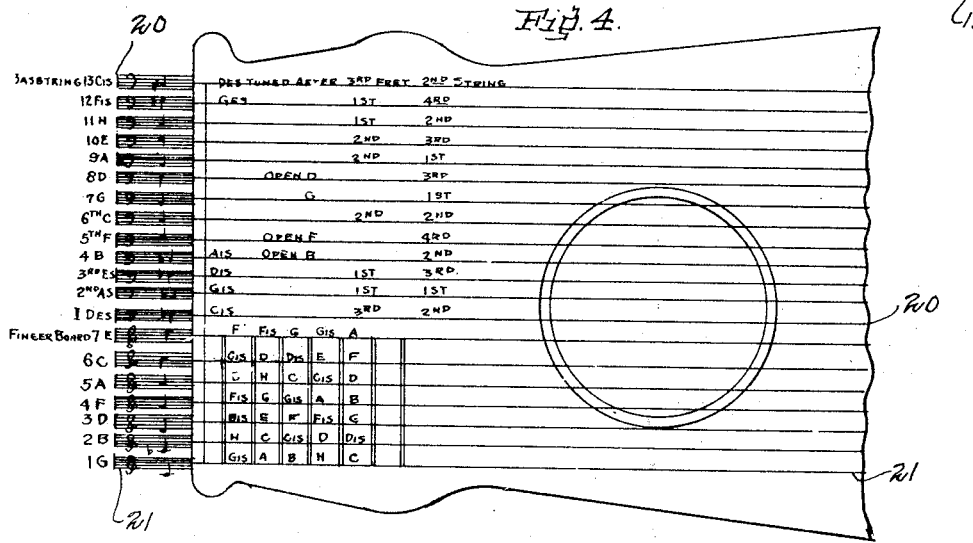
INVENTOR
Max Meisel
BY
George C. Heinitz
ATTORNEY Patented Jan. 5, 1932

1,839,244

UNITED STATES PATENT OFFICE

MAX MEISEL, OF NEW YORK, N. Y.

NECKLESS GUITAR-MANDOLIN

Application filed March 29, 1929. Serial No. 350,978.

This invention relates to improvements in musical instruments, particularly to a novel combined guitar and mandolin, and it is the principal object of my invention to provide a neckless combination guitar and mandolin equipped with a novel finger-board having any desired suitable number of frets.

Another object of my invention is the provision of a guitar-mandolin with a comparatively limited finger-board which however, allows for the playing of all accords existing or taught in the teaching of music or harmony, and which facilitates the fingering and finding of the notes as well as the playing and learning to a degree not heretofore achieved by any of the known instruments equipped with finger boards.

A further object of my invention is the provision of a combination guitar and mandolin preferably equipped with strings, or with a double set of strings, as for instance the mandolin, or with seven strings for playing and thirteen free basses for accompaniment.

A still further object of my invention is the provision of a guitar-mandolin adapted to further the love of good house music especially amongst young people, and one which has the possible widest range as it permits the playing of all accords known so far and is especially well adapted to accompany singers.

These and other objects and advantages of my invention will become more fully known as the description thereof proceeds and will then be more specifically defined in the appended claims.

In the accompanying drawings forming a material part of this disclosure:

Fig. 1 is a perspective view of a combined neckless guitar and mandolin constructed according to my invention.

Fig. 2 illustrates diagrammatically the current notation of the finger board illustrating the fingering of the notes on all strings in finger note script.

Fig. 3 is a similar view illustrating violin key note script.

Fig. 4 illustrates diagrammatically the notations of the bass-strings and the tune range in violin key notes and gives instructions in tuning the guitar-mandolin constructed according to my invention.

As illustrated, the body 10 of the combination guitar-mandolin has no neck but a fingerboard 11 on one of its ends and preferably 7 strings 12, a sound-hole 13, and a bridge 14 over which the strings are guided in the customary manner to be secured at their ends to the well known keys 15 for tuning, and a tail pin 16. In order to facilitate the fingering of the notes, the key board end of the guitar-mandolin body is preferably formed as indicated at 17.

In Figures 2, 3, and 4, the several note scales are illustrated to enable a player to play the instrument correctly and facilitating the rapid finding of the note to be played.

In Figure 2, a scale 18, is shown constituting the correct and continuous notation of the notes over all strings on the finger-board in a specially adopted script for readily teaching the play of the guitar-mandolin by suitable finger operation, even without knowledge of notes in general.

As shown in this figure the current notations of the finger board show that most of the notes are to be found on two different strings, and in this manner the playing of accords or harmonies is essentially or substantially facilitated.

The gamut of the finger board strings extends from small G to A over two octaves, and my novel neckless guitar-mandolin has therefore a gamut of more than three octaves.

In this figure, the dashes 22 behind the finger-notes indicate the frets on which the respective tone is located serving to shorten the strings and thereby to raise the tone. This raising of the note from fret to fret amounts to one half tone each.

In Figure 3, scale 19 illustrates the notes in violin key script.

In Figure 4, scale 20 illustrates the guitar-mandolin with 13 free bass strings (for playing the accompaniment) and 21 the 7 strings for the finger board.

All bass strings are tuned in intervals of the fifth cycles or sets and the same are located to the right of any base string, which simultaneously forms the base tone for the overdominant tri-tone.

To the left of each bass the intervals of the fourth are located, and as bass tone, the fifth of the subdominant, so that three bass strings belong to one tone scale or pitch. The third for any of the basses is found by skipping three strings from the bass tone towards the right, as for instance bass tone C third E, fifth G, played alternately will result in a harmonious change or variation in the accompaniment.

The third bass for the minor flat accord is located three notes to the left of the key note or tonic.

It will be evident that I have invented a new guitar-mandolin, allowing an unrestrained, natural fingering not necessitating any acrobatic finger distortion, while producing the highest possible values in harmonies, and enabling young and old, laymen and artists to play the instrument with facility.

The note volume and range obtainable on the new instrument is sufficient for accompaniment for the human singing voice, whether solo or played in accompaniment of entire schools or singing societies, as upon the four first strings already all musical accords can be played. Each trio of strings and one fret enable already the playing of eight triads and every further fret augments or increases this number.

The tuning of the strings for small and more voluminous triads results in making the free strings available for G minor D minor A minor and B major F major C major etc., and it will not be difficult to imagine that with five frets the number of accords can be fingered in four or five fold reversal and on the bass lute in seven or eight fold reversal.

It will be understood that I have disclosed the preferred form of instrument and the manner of playing the same without, however, to restrict myself to the exact features, and that I may make such changes as come within the scope of the appended claims without departure from my invention and the principles involved.

Having thus described my invention, what I claim as new and desire to secure by Letters Patent is:

1. A neckless guitar-mandolin comprising a comparatively small finger board allowing the fingering of all musical accords, seven finger board strings and thirteen free basses on said instrument, and a plurality of frets formed therewith, each of said frets adapted to be engaged by the fingers for shortening the strings and raising the tone for one half tone at each fret.

2. The combination of a guitar-mandolin having a short finger board, and a plurality of frets, seven strings and thirteen bass strings, with a means for tuning the strings, permitting the playing of all musical accords on the first found strings, each three strings and one fret enabling the playing of eight triads, the addition of any further fret increasing the number of triads.

3. The combination of a guitar-mandolin having a comparatively short finger-board and a plurality of frets, seven strings and thirteen bass-strings with a means for extending the tune volume from the small G to A over two octaves.

4. A combination guitar-mandolin comprising a neckless body having a sound hole and undercut at one end, a finger board on said body at its undercut portion, a bridge and keys arranged on said body behind said bridge, and seven strings guided over said fingerboard and bridge to be secured to said keys.

5. In a neckless combination guitar and mandolin having a gamut of more than three octaves, a fingerboard at one of the ends of the instrument, means for allowing a finding of the notes on two different strings for facilitating the playing of accords or harmonies, frets allowing the raising of the notes between each two frets for one-half tune each, and dashes behind the fingernotes to allow a ready location of the frets.

Signed at New York, in the county of New York and State of New York this 26th day of March A. D. 1929.

MAX MEISEL.